United States Patent
Kim et al.

(10) Patent No.: US 6,307,611 B1
(45) Date of Patent: Oct. 23, 2001

(54) METHOD FOR MANUFACTURING PIXEL ELECTRODES OF LIQUID CRYSTAL DISPLAY

(75) Inventors: Gi Hwan Kim, Chungchonbuk-do; Seong Sil Im, Kyoungki-do, both of (KR)

(73) Assignee: Hyundai Electronics Industries Co., Ltd., Kyoungki-do (KR)

(*) Notice: Subject to any disclaimer, the term of this patent is extended or adjusted under 35 U.S.C. 154(b) by 0 days.

(21) Appl. No.: 09/343,095

(22) Filed: Jun. 29, 1999

(30) Foreign Application Priority Data

Jun. 30, 1998 (KR) .................................................. 98-25854

(51) Int. Cl.$^7$ ................................................ G02F 1/1333
(52) U.S. Cl. .............................................................. 349/138
(58) Field of Search .................................... 349/187, 143, 349/139, 147, 138

(56) References Cited

U.S. PATENT DOCUMENTS

| | | | |
|---|---|---|---|
| 4,589,733 | 5/1986 | Yaniv et al. | 350/332 |
| 5,461,501 | * 10/1995 | Sato et al. | 359/59 |
| 5,663,020 | 9/1997 | Yamaue et al. | 430/20 |
| 5,708,485 | * 1/1998 | Sato et al. | 349/42 |
| 5,731,854 | 3/1998 | Kishida | 349/40 |
| 5,734,452 | 3/1998 | Yamaue et al. | 349/49 |
| 5,784,132 | * 7/1998 | Hashimoto | 349/44 |
| 5,838,405 | 11/1998 | Izumi et al. | 349/73 |
| 5,844,644 | 12/1998 | Oh et al. | 349/95 |
| 5,926,240 | * 7/1999 | Hirota et al. | 349/114 |
| 5,990,988 | * 11/1999 | Hanihara et al. | 349/48 |
| 6,081,305 | * 6/2000 | Sato et al. | 349/5 |
| 6,115,097 | * 9/2000 | Yamazaki | 349/151 |

FOREIGN PATENT DOCUMENTS

| | | |
|---|---|---|
| 9-152602 | 6/1997 | (JP) . |
| 10-170902 | 6/1998 | (JP) . |

\* cited by examiner

*Primary Examiner*—James A. Dudek
*Assistant Examiner*—Andrew Schechter
(74) *Attorney, Agent, or Firm*—Ladas & Parry

(57) ABSTRACT

Disclosed is a method for manufacturing pixel electrode of liquid crystal display, comprising the steps of: providing a transparent insulating substrate where thin film transistors having a signal electrode are arranged; coating a first organic insulating layer over the transparent insulating substrate to cover the signal electrode; hardening the first organic insulating layer; forming a first contact hole to expose the signal electrode in the first organic insulating layer; forming a first pixel electrode being in contact with the signal electrode through the first contact hole over the first organic insulating layer; coating a second organic insulating layer over the first organic insulating layer including the first pixel electrode; hardening the second organic insulating layer; forming a second contact hole to expose the first pixel electrode in the second organic insulating layer; and forming a second pixel electrode being in contact with the first pixel electrode over the first organic insulating layer.

2 Claims, 3 Drawing Sheets

METHOD FOR MANUFACTURING PIXEL ELECTRODES OF LIQUID CRYSTAL DISPLAY

BACKGROUND OF THE INVENTION

1. Field of the Invention

The present invention generally relates to a method for manufacturing liquid crystal display, and more particularly to a method for manufacturing pixel electrodes.

2. Description of the Related Art

Liquid crystal displays (LCDs) have been used for displaying means for watches, calculators and recently television sets and monitors. The thin film transistor-liquid crystal display (TFT-LCD) has an excellent response characteristic and is suitable for a device having high number of pixels, and therefore excellent picture quality and large scale screen comparable to the Cathode Ray Tube monitor can be obtained.

The TFT-LCD as described above, comprises a TFT array substrate arranged with TFTs at an inner surface thereof; a color filter substrate opposed to the TFT array substrate and arranged color filters at an inner surface thereof; and a liquid crystal layer sandwiched between the substrates. In the TFT-LCD as above, the aperture ratio, i.e. a transmittance ratio of a substantially incident light to a dimension of pixel electrode, affects display characteristic of the TFT-LCD. Generally, when the aperture ratio becomes large, the display characteristic is also improved. Accordingly, there have been suggested various structures of TFT-LCD to improve the display characteristic. For example, the top ITO structure has been proposed.

FIG. 1 is a plan view showing a TFT array substrate according to conventional top ITO type. As shown in the drawing, a gate line 2 and a storage line 4 are disposed parallel in a row direction and a data line 8 is disposed to cross over the gate line 2 and the storage line 4. A TFT 10 is arranged at an intersection of the gate line 2 and the data line 8. Herein, the TFT 10 includes a gate electrode elongated from the gate line 2 and a semiconductor layer 6 disposed over the gate electrode with intervening a gate insulating layer (not shown), and source and drain electrodes 9a, 9b disposed on the semiconductor layer 6 and separated with a selected distance.

A transparent conduction layer, for example ITO (Indium Tin Oxide) is disposed at a pixel region defined by the gate line 2 and data line 8. At this time, a pixel electrode 13 is disposed to be overlapped with some portions of the gate line 2 and the data line 8 and also to be in contact with the source electrode 9a.

FIG. 2 is a cross-sectional view taken along II—II in FIG. 1 and a manufacturing method will be described with reference to FIG. 2.

A transparent insulating substrate, for example a glass substrate 1 is provided, and a gate line 2 and a storage line 4 are formed on the glass substrate to be spaced with each other. A gate insulating layer 3 is formed over the glass substrate 1 to cover the gate line 2 and the storage line 4. A semiconductor layer 6 is formed on the gate insulating layer 3 over the gate line 2. A metal layer for data line is formed over the gate insulating layer including the semiconductor layer 6. Next, a data line 8 and source and drain electrodes 9a and 9b are formed by patterning the metal line for data line. As a result, a TFT 10 is fabricated.

An organic insulating layer 11 having a low dielectric constant is formed on the above resultant and a contact hole 12 is formed in the organic insulating layer 11 to expose the source electrode 9a by a known method. Herein, the organic insulating layer 11 is coated with a sufficient thickness to prevent the capacitive coupling that is occurred between the data line 8 and a pixel electrode to be formed later.

A pixel electrode 13 is formed by depositing an ITO within the contact hole 12 and on the organic insulating layer 11 and then patterning the ITO. Herein, the pixel electrode 13 is formed to be overlapped with some portions of the gate line 2 and the data line 8 and to be in contact with the source electrode 9a.

Since the pixel electrode 13 is disposed to be overlapped with the gate line 2 and the data line 8, the TFT-LCD comprising TFT array substrate as described above has a relatively superior aperture ratio to the conventional TFT-LCD that the pixel electrode is disposed only within a pixel region.

However, the pixel electrode has quite a bad reliability due to low adhesion intensity between the ITO and the organic insulating layer.

More particularly, due to the low adhesion between the ITO of an inorganic material and the organic insulating layer, the ITO having relatively thinner thickness compared to the organic insulating layer is severely stressed while pattering. Of the stress applied to the ITO during the patterning process, as shown in FIG. 3, the stress applied to the portion of the ITO which is formed on the organic insulating layer 11, especially the peripheral portion A of the ITO pattern is greater than the stress applied to the portion of the ITO which is contacted with the source electrode 9a which is a signal electrode of the TFT 10 and therefore there is occurred the lift-off phenomenon that the peripheral portion of the ITP pattern is lifted off owing to the stress. As a result, the reliability in the pixel electrode is degraded. Furthermore, in order to prevent the peripheral portion of the ITO from lifting off, line width of the peripheral portion of the ITO formed on the portion of the organic insulating layer 11 which is adjacent to the contact hole 12 should be increased. Therefore, it is very difficult to control the line width of the ITO.

SUMMARY OF THE INVENTION

Accordingly, it is one object of the present invention to provide a method for manufacturing pixel electrodes of LCD capable of controlling line width and improving the reliability.

The foregoing object of the present invention can be achieved by a method for manufacturing pixel electrode of liquid crystal display comprising the steps of: providing a transparent insulating substrate where thin film transistors having a signal electrode are arranged; coating a first organic insulating layer over the transparent insulating substrate to cover the signal electrode; hardening the first organic insulating layer; forming a first contact hole to expose the signal electrode in the first organic insulating layer; forming a first pixel electrode being in contact with the signal electrode through the first contact hole over the first organic insulating layer; coating a second organic insulating layer over the first organic insulating layer including the first pixel electrode; hardening the second organic insulating layer; forming a second contact hole to expose the first pixel electrode in the second organic insulating layer; and forming a second pixel electrode being in contact with the first pixel electrode over the first organic insulating layer.

In accordance with the present invention, the organic insulating layer is a resin layer and the first and second pixel electrodes are comprised of an ITO.

BRIEF DESCRIPTION OF THE DRAWINGS

The present invention will be readily understood from the detailed description given hereinbelow and the accompanying drawings as follows.

DETAILED DESCRIPTION OF THE INVENTION

Figure 1:
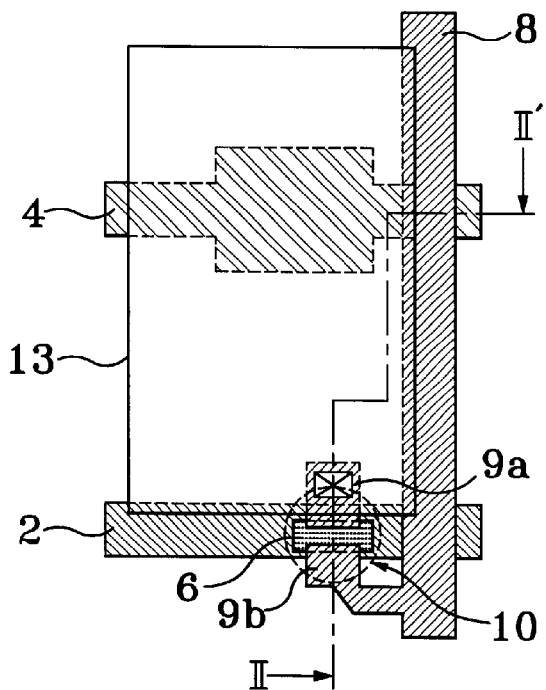
FIG. 1 is a plan view showing a TFT array substrate having a top ITO structure in the prior art.
Figure 2:
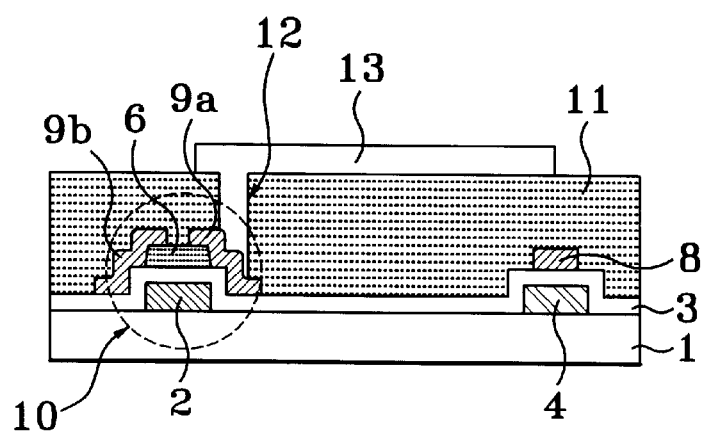
FIG. 2 is a cross-sectional view taken along the line II—II in FIG. 1.
Figure 3:
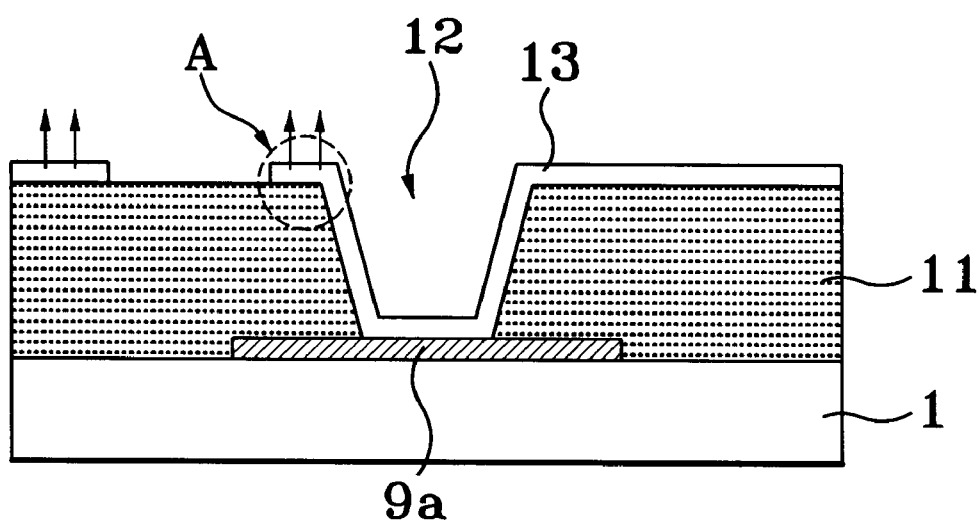
FIG. 3 is a cross-sectional view of a TFT array substrate illustrating lift-off phenomenon of an ITO pixel electrode in the prior art.
Figure 4A:
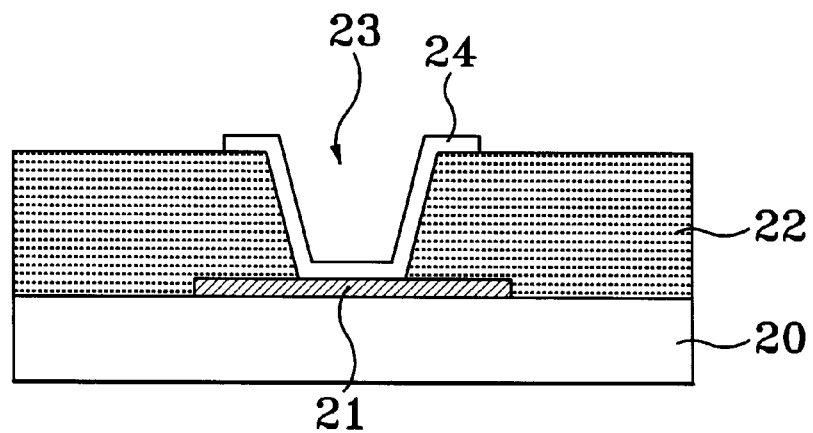
FIGS. 4A to 4B are cross-sectional views for illustrating the method for manufacturing pixel electrode in accordance with an embodiment of the present invention.

Referring to FIG. 4A, a transparent insulating substrate 20 is provided, and a TFT (not shown) having a signal electrode 21 is formed on the transparent insulating substrate 20. A first organic insulating layer 22 such as a resin layer, is coated over the transparent insulating substrate to cover the signal electrode 21. At this time, the first organic insulating layer 22 is coated at a thickness that is thinner than that of the organic insulating layer to be finally formed in an ITO type structure, for example half of the thickness of the organic insulating layer to be finally formed. The first organic insulating layer 22 is hardened by baking or curing process.

Next, a contact hole 23 to expose the signal electrode 21 is formed by selectively removing the first organic insulating layer 22. An ITO layer is formed on the above resultant and a first pixel electrode 24 being in contact with the signal electrode 21 through the contact hole 23 is formed over the first organic insulating layer 22 by patterning the ITO layer.

Herein, the first organic layer has a harder property than a conventional one by a baking or curing process, since the first organic insulating layer 22 has a thinner thickness than the conventional organic insulating layer. Accordingly, when an ITO layer for a signal electrode is deposited on the first organic insulating layer 22, the adhesion property between the first organic insulating layer 22 and an ITO metal layer for a first pixel electrode to be formed later is improved compared to the adhesion property of a conventional organic layer and therefore less stress is applied to the ITO metal layer while patterning. As a result, no more lift-off phenomenon is occurred at the peripheral portion of the first pixel electrode 24 on the first organic insulating layer 23.

Figure 4B:
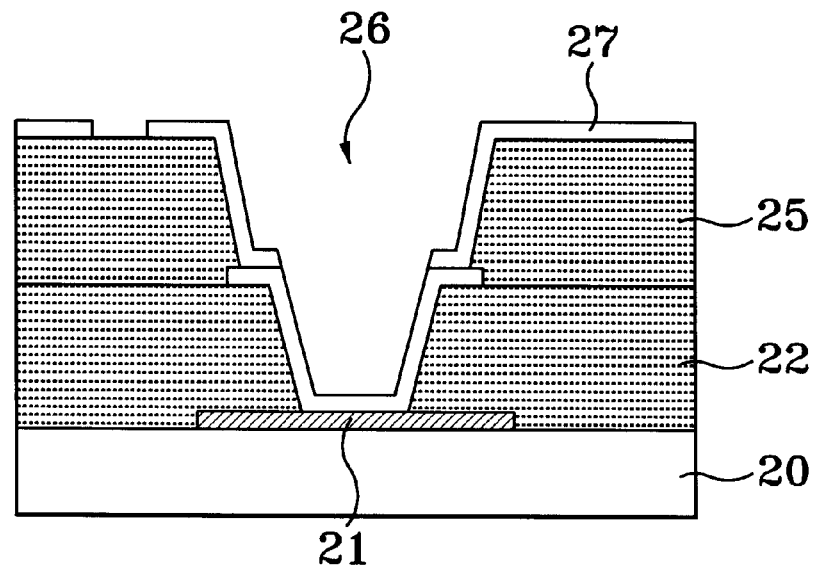

Referring to FIG. 4B, a second organic insulating layer 25 such as a resin layer having a similar thickness with the first organic insulating layer 22 is coated on the above resultant, and the second organic insulating layer 25 is hardened by baking or curing process.

A second contact hole 25 to expose the first pixel electrode 24 is formed by selectively removing the second organic insulating layer 25. An ITO conduction layer is deposited on the above resultant and a second pixel electrode 27 is formed by patterning the ITO conduction layer. Herein, similar to the first organic insulating layer 23, since the second organic layer is thinly formed as compared with a conventional organic layer and then hardened, the second organic insulating layer 25 is harder than the conventional one. Accordingly, the adhesion property between the second organic insulating layer 25 and an ITO layer for a second pixel electrode to be later is improved and less stress is applied to the ITO metal layer during the etching process thereof. As a result, it is easy to control line width of an pixel electrode since no lift-off phenomenon is occurred at the peripheral region of the second pixel electrode 27.

As described above, since the pixel electrode in the present invention are fabricated in two steps, it is easy to control line width of the pixel electrode and reliability of the pixel electrode is improved. Namely, when thickness of the organic insulating layer is thin as in the embodiment of the present invention, the insulating layer harder than the conventional one may be obtained. Therefore, the interface adhesion property between the organic insulating layer and the ITO for the pixel electrode is improved, thereby reducing the stress in the ITO formed over the organic insulating layer. Accordingly, the lift-off phenomenon of the ITO can be is prevented so that it is easy to control the line width of the pixel electrode and reliability of the metal electrode cab improved.

Furthermore, while the present invention is described and illustrated with two manufacturing steps, it is also possible to manufacture the pixel electrodes with two or more manufacturing steps.

Various other modifications will be apparent to and can be readily made by those skilled in the art without departing from the scope and spirit of the present invention. Accordingly, it is not intended that the scope of the claims appended hereto be limited to the description as set forth herein, but rather that the claims be broadly construed.

What is claimed is:

1. A method for manufacturing pixel electrode of liquid crystal display comprising the steps of:

providing a transparent insulating substrate where thin film transistors having a signal electrode are arranged;

coating a first organic insulating layer over the transparent insulating substrate to cover the signal electrode;

hardening the first organic insulating layer;

forming a first contact hole to expose the signal electrode in the first organic insulating layer;

forming a first pixel electrode being in contact with the signal electrode through the first contact hole over the first organic insulating layer, wherein the first pixel electrode is comprised of an ITO;

coating a second organic layer insulating layer over the first organic insulating layer including the first pixel electrode;

hardening the second organic insulating layer;

forming a second contact hole to expose the first pixel electrode in the second organic insulating layer; and forming a second pixel electrode being in contact with the first pixel electrode over the first organic insulating layer, wherein the second electrode is comprised of an ITO.

2. The method as claimed in claim 1, wherein the organic insulating layers are resin layers.

* * * * *